R. J. STIMSON.
TRACTOR.
APPLICATION FILED JUNE 29, 1917.

1,293,971.

Patented Feb. 11, 1919.
3 SHEETS—SHEET 1.

Witnesses
Arthur F. Draper
Chas. W. Stauffiger

Inventor
Ralph J. Stimson
By
Attorneys

R. J. STIMSON.
TRACTOR.
APPLICATION FILED JUNE 29, 1917.
1,293,971.
Patented Feb. 11, 1919
3 SHEETS—SHEET 2.
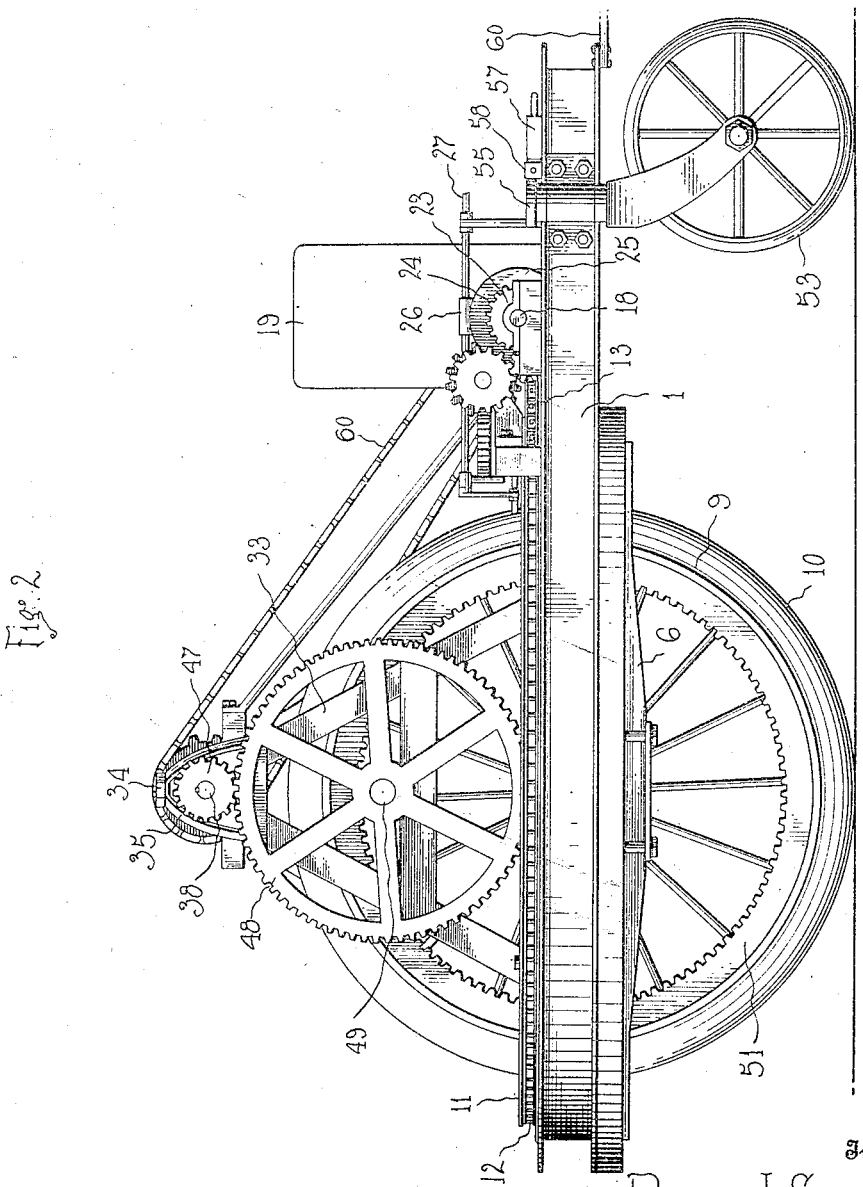
Fig. 2
Witnesses
Arthur F. Draper
Chas. W. Stauffiger
Inventor
Ralph J. Stimson
By
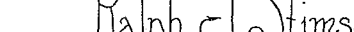
Attorneys

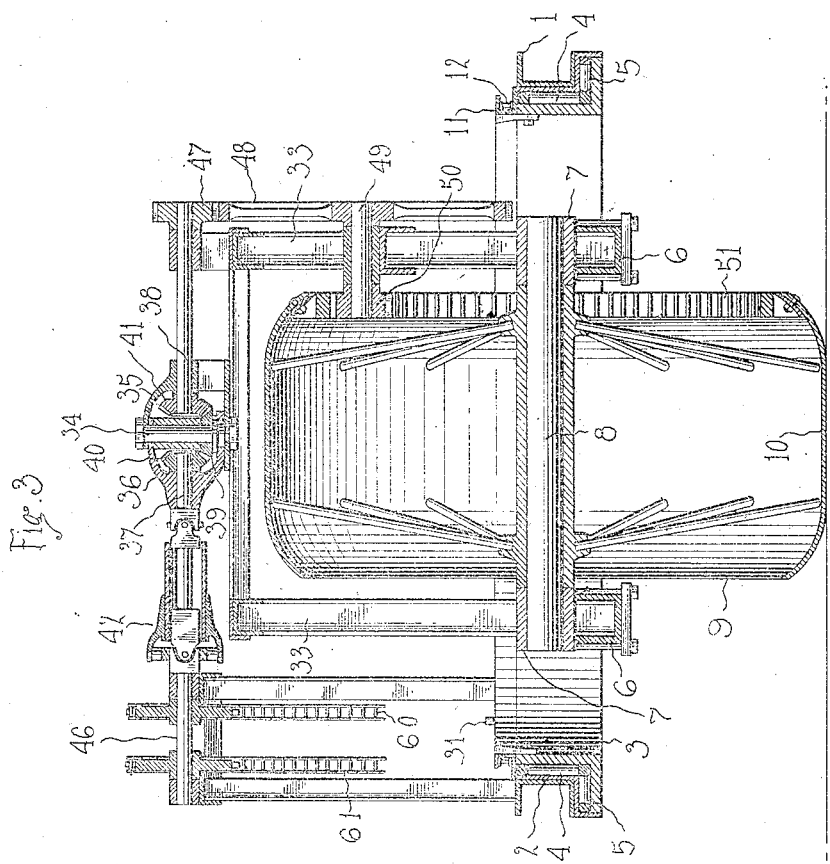

UNITED STATES PATENT OFFICE.

RALPH J. STIMSON, OF ROGERSVILLE, MICHIGAN.

TRACTOR.

1,293,971.  Specification of Letters Patent.  Patented Feb. 11, 1919.

Application filed June 29, 1917. Serial No. 177,693.

*To all whom it may concern:*

Be it known that I, RALPH J. STIMSON, a citizen of the United States of America, residing at Rogersville, in the county of Genesee and State of Michigan, have invented certain new and useful Improvements in Tractors, of which the following is a specification, reference being had therein to the accompanying drawings.

In doing work with a tractor it is often desirable to make very short turns. In many cases the implement drawn should be swung off shortly, or even turned completely around, while standing in one spot and should not be moved ahead until it faces the desired position.

This invention relates to tractor construction and particularly to an arrangement of the driving and steering mechanism which permits the drive wheel and pilot wheel to be combined in one for the purpose of turning the tractor and the implement around in an extremely small space.

This invention also relates to means for steering the tractor by the power of the motor and to means for keeping the movements of the steering gear within certain desired limits.

The invention consists in the matters hereinafter set forth, and more particularly pointed out in the appended claims.

Referring to the drawings,

Fig. 2 is a view in side elevation thereof, and

Fig. 3 is a view in section on or about line III—III of Fig. 1.

Figure 1:
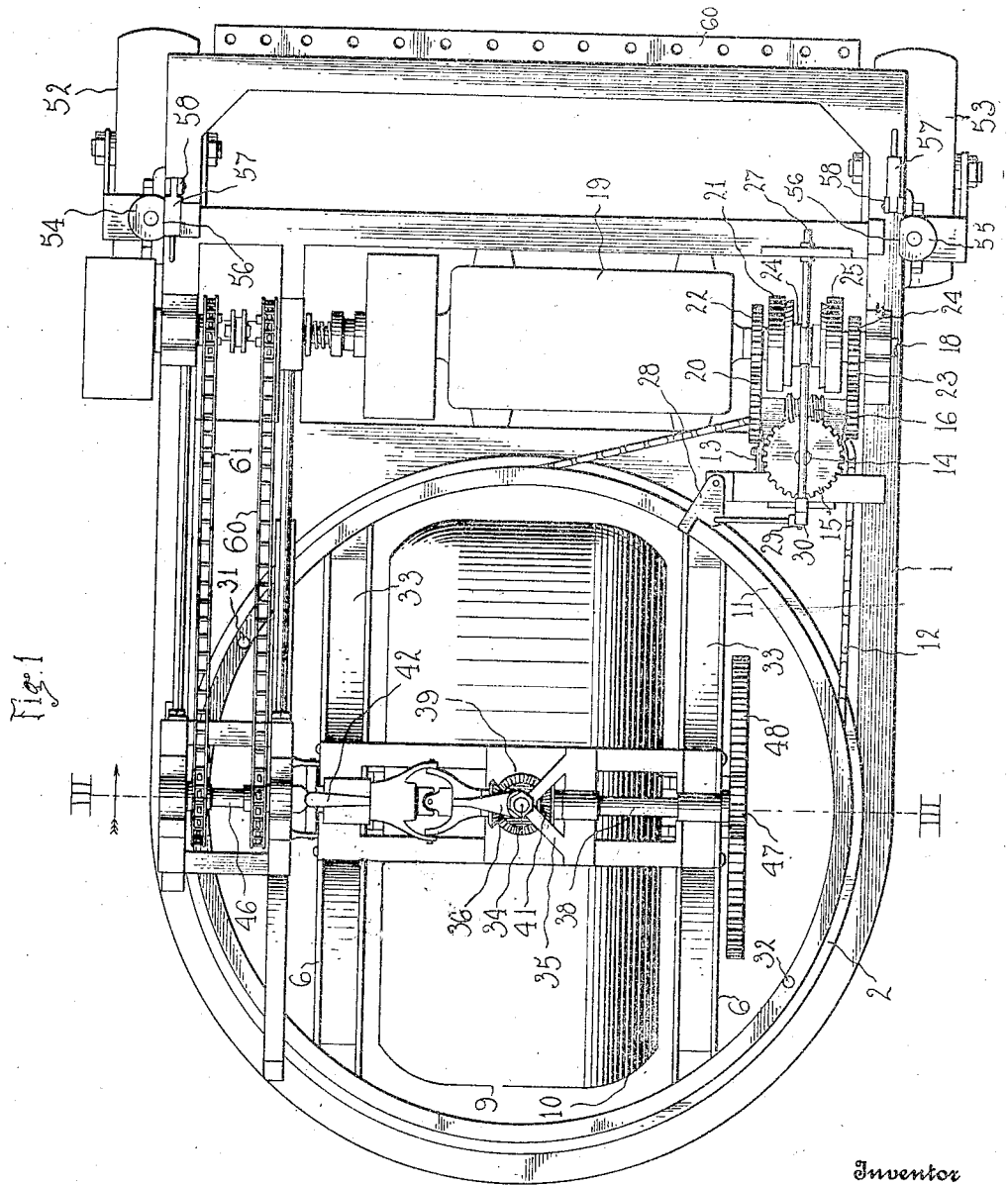
Figure 1 is a plan view of a tractor embodying features of this invention.

The forward portion of a main frame 1 carries a circular track 2 that is L-shaped in cross section. A fifth wheel 3, preferably an angle bar in section, is rotatable within the ring 2 on suitable side thrust bearings 4 and load bearings 5. Cross members 6 of the fifth wheel afford support through appropriate bearings 7 for a main axle or journal 8 of a tractor bearing wheel 9 of any selective type that provides a broad tread 10. As herein shown, this tread has rounded marginal portions. Displacement of the ring 3 on the track 2 is resisted by a channel bar guard ring 11, between the flanges of which lies a sprocket chain 12, the latter passing around a sprocket wheel 13 keyed or otherwise made fast to the upright shaft 14 of a worm wheel 15. The latter meshes with a worm 16, that is driven from the main shaft or an extension 18 thereof, of a motor 19. A gear train 23 of two or an even number of gears, drives the worm in a reverse direction to the shaft 18 through the medium of a clutch 25 that connects the wheel 24 of the train and the shaft 18. Rotation in the same direction as the shaft is attained by a three wheel or odd-wheel train 20, the driving gear 22 of which may be coupled to the extension 18 of the main shaft by a suitable clutch 21 reversely disposed to the clutch 25. A shifting member 26 coupling the engaging parts of the clutches 21 and 25 to move together, effects the engagement of the shaft with either train, the manipulating means of the shifting member being not illustrated herein as it is not *per se* a part of this invention.

But the shaft 27 which operates the shifting member 26 is automatically controlled by the wheel frame so that the wheel itself cannot be thrown into a position more than at right angles to the length of the frame. A knock-off plate 28 that is pivoted to the main frame is linked by a rod 29 to a rock arm 30 of the shaft 27. A knock-off pin 31 on the fifth wheel engages the knock-off plate 28 when the traction wheel is turned in one direction and thereby throws the clutch 25 out of engagement while a pin 32 on the fifth wheel throws the plate 28 in the opposite direction and effects disengagement of the companion clutch 21 so that the limit of motion of the traction bearing wheels is a position at right angles to the main frame in either direction of the swing.

A yoke frame 33 of appropriate design spans over the main traction bearing wheel and swings with it, the vertical center of motion being concentric with that of a stud 34 on the frame. The latter affords pivotal support for the two members 35 and 36 of a coupling bearing, in which the oppositely disposed and alined members 37 and 38 of a power shaft are journaled. An intermediate bevel wheel 39 on the stud meshes with pinions 40 and 41 on the shaft sections. A universal coupling of appropriate design as indicated at 42, designed to permit play between the parts, connects the shaft section 37 with the main shaft 46. A take-off pinion 47 on the section 38 meshing with a gear 48 imparts motion through a countershaft 49 and bull pinion 50 to an inner annular gear 51 secured on the traction wheel and thereby rotates the later.

It is to be understood that the coupling member 42 not only includes the double universal joint shown but also a telescopic intermediate section whereby variations caused by weaving in the frame may be accounted for and whereby there is absolutely no chance of binding through the driving train. A pair of sprocket chains 60 and 61 are herein shown as connecting the shaft 46 with the main power plant, with appropriate clutch connections and gear reducing trains to provide the necessary change of speed and direction of drive, but inasmuch as such connections do not form *per se* a part of this invention, and inasmuch as such transmissions may be of any type, they are not specifically described or claimed herein. It is to be understood that any form of transmission between the motor 19 and its countershaft appropriate to machines of this type, may be used.

Caster wheels 52 and 53 support the rear end portion of the frame. The wheels follow the movement of the tractor without having any effect on the direction of travel, simply serving to hold up the rear end of tractor frame, so long as there is an implement or trailer that is appropriately connected to the rear of the frame as to a draft bar 60. That is, the implement or trailer should be coupled to the rear of the frame in a manner to hold the frame of the implement in alinement with that of the tractor, so that the implement and the tractor form a single unit which is more readily and accurately guided and controlled than when the connection permits lateral or angular displacement of the coupled parts. When, however, the tractor is to be operated without such trailing implement, or when the implement is so attached as not to become a unit of the tractor, the wheels 52 and 53 are arranged to be locked rigidly in a line with a frame. Preferably this may be accomplished by means of a disk 54 and a corresponding disk 55 mounted on the upright spindles respectively of the caster wheels, and each having a cut away portion affording a face 56 against which a stop lock or latch 57 may be swung through appropriate guides 58, the wheel 52 being herein shown locked and the wheel 53 unlocked to explain this construction.

In the conventional form of tractor construction, the drive wheel or wheels are separate from the pilot wheel and in making a turn the pilot wheel must receive the driving thrust at an angle to its line of travel and the pulling efficiency of the tractor decreases in proportion to the increase in the angle to which the pilot wheel is turned. If the pilot wheel were turned at right angles, which is the necessary position to make an extremely short turn, the driving thrust would be given at right angles to the face of the wheel and would not revolve it at all. Thus it will be seen that the use of a combined steering and driving wheel is an improvement over the ordinary arrangement as the driving force is within the pilot wheel and can move the front of the tractor in any desired direction, while the efficiency of the tractor is as great when making a turn as when going straight ahead.

In making a sharp turn, with the tractor coupled as a unit with an implement, the path of the drive wheel is an arc whose center is a point midway between the wheels of the implement. Thus the implement may be swung to face in any desired direction while standing in one place.

To make a sharp turn the tractor is stopped and the transmission held out of gear while the steering gear is operated to turn the drive wheel to a transverse position. The transmission is then put in gear which causes the drive wheel to swing the front end of the tractor around. As soon as the desired direction is attained the drive wheel is again stopped, by disengaging the transmission, until it is turned straight again by the steering gear, when it is ready to drive the tractor ahead in the new direction.

Obviously, changes in the details of construction may be made without departing from the spirit of my invention and I do not care to limit myself to any particular form or arrangement of parts.

What I claim is:—

1. A tractor comprising a frame, a fifth wheel journaled in the frame, a traction bearing wheel journaled in the fifth wheel and adapted to turn therewith, a yoke frame on the fifth wheel spanning the traction bearing wheel, a spindle mounted on the yoke in axial alinement with the fifth wheel, a gear train mounted on the yoke frame and connected at the take-off end to the traction bearing wheel and at the power end to a gear mounted on the spindle, a power shaft on the main frame, and flexible driving connections between the power shaft and spindle gear wheel for driving the traction bearing wheel from said shaft.

2. A tractor comprising a main frame, a traction bearing wheel journaled in the main frame and adapted to turn on an axis therein transverse to the axis of rotation, a yoke frame mounted to turn with the main traction bearing wheel, a spindle on the yoke frame in axial coincidence with the axis of turning of the traction bearing wheel, a beveled gear rotatable on the spindle, a gear train on the frame adapted to positively connect the beveled gear and the traction bearing wheel, a power shaft on the main frame, and an intermediate shaft between the power shaft and the yoke frame spindle operatively coupled through appropriate gearing and flexible connections with said pinion shaft and beveled gear to operate the traction bearing wheel.

3. A tractor comprising a frame, a power plant mounted thereon, a fifth wheel journaled in the frame, means connected to the fifth wheel and to the power plant adapted to swing the fifth wheel in either direction, means to automatically define the limit of motion of the fifth wheel in the frame, a traction wheel journaled in the fifth wheel, a yoke frame mounted on the fifth wheel, a gear train mounted on the yoke frame for driving the traction bearing wheel, and including a beveled pinion, a spindle on the yoke frame in axial alinement with the axis of rotation of the fifth wheel, a beveled gear on the spindle meshing with the pinion, a power shaft on the main frame, and an intermediate shaft, having swivel and Cardan joint connections with the power shaft, and a pinion on one of the intermediate shaft sections meshing with the spindle gear.

4. A tractor comprising a main frame, a fifth wheel rotatably mounted therein, a single traction bearing wheel journaled in the fifth wheel for supporting a portion of the main frame, caster bearing wheels supporting the other portion of the main frame, means for locking the caster bearing wheels in longitudinal alinement with the frame, a power plant on the frame, means operatively connecting the power plant with the fifth wheel for turning the latter in either direction, means on the main frame and fifth wheel for automatically arresting the movement of the fifth wheel in either direction at a prescribed limit, change speed and reversing mechanism mounted on the main frame and connected to the power plant, a yoke frame on the fifth wheel spanning the traction bearing wheel, a spindle on the yoke in axial coincidence with the axis of the fifth wheel, gearing mounted on the yoke frame and connected to the traction bearing wheel to drive the latter, a beveled gear mounted on the spindle for engaging and driving the latter train, a pinion for driving the beveled gear, and a sectional shaft having universal and longitudinally expansible joint connections and coupling the beveled pinion and the transmission mechanism for driving the traction wheel in any angular position assumed by the fifth wheel.

5. In a tractor, a horizontally disposed main frame, a fifth wheel journaled therein, a traction bearing wheel journaled in the fifth wheel, a yoke frame on the fifth wheel spanning the traction bearing wheel, a bull gear on the traction bearing wheel, a bull pinion engaging the bull gear, a transmission gearing train driving the bull pinion and turning in the yoke frame, a spindle on the yoke frame in axial coincidence with the axis of the fifth wheel, a drive shaft for the yoke frame gear train transverse to the spindle, a beveled gear on the spindle, a beveled pinion on the shaft in mesh with the gear, change speed and reversing mechanism on the main frame, a shaft driven thereby having loosely coupled and longitudinally extensible sections, one of which is adjacent the spindle, means for supporting said shaft sections in operative relation to the spindle, and a bevel pinion on one of said sections meshing with the spindle gear.

6. In a tractor, a main frame, a traction bearing wheel journaled in the frame, and adapted to turn on an axis transverse to its axis of rotation in the frame, a yoke frame spanning the wheel and turning therewith, a spindle on the yoke frame in axial coincidence with the transverse axis of the traction bearing wheel, a coupling bearing having two oppositely disposed members each pivoted on the spindle, a beveled gear rotatable on the spindle, a take-off shaft journaled in one of the members of the coupling bearing, a beveled pinion driving said shaft in mesh with the beveled gear, and a power shaft member journaled in the other part of the coupling bearing and provided with a beveled pinion meshing with and driving the spindle gear.

7. In a tractor, a main frame, a traction bearing wheel journaled in the main frame and swiveled to turn on an axis transverse to its axis of rotation, a yoke frame turning with the traction bearing wheel, a spindle on the yoke frame in axial coincidence with the transverse axis of the traction bearing wheel, a coupling bearing having two oppositely disposed members each secured to the spindle, power connections for driving the traction bearing wheel including a shaft having both universal and longitudinally extensible couplings and terminating in a part that is journaled in one of the coupling bearing members, a take-off shaft journaled in the other bearing member, and a beveled gear train operatively connecting the shaft parts in the coupling bearing members and including an intermediate beveled gear journaled on the spindle with pinions in mesh therewith, each secured to one of said shaft parts.

8. In a tractor, a main frame, a fifth wheel journaled in the frame, a traction bearing wheel journaled in the fifth wheel, a power plant, a power shaft on the plant, forward and reverse gear trains, a clutch for each train adapted to couple it with the power shaft, a worm driven by the trains, a worm wheel operated by the worm, a sprocket wheel operated by the worm wheel, an endless sprocket wheel chain embracing the sprocket wheel and the fifth wheel for turning the latter, a pair of oppositely disposed knock-off pins on the fifth wheel, a knock-off plate pivoted on the main frame to swing in the path of the knock-off pins, and connections between the knock-off plate and the clutches whereby contact with one pin releases one clutch and contact with the other pin throws the other clutch out.

9. In a tractor, a horizontally disposed main frame, a fifth wheel journaled in the main frame, a traction bearing wheel journaled in the frame, a yoke frame on the fifth wheel spanning the traction bearing wheel, a spindle on the fifth wheel in alinement with the axis of rotation of the fifth wheel, a power plant on the main frame, a reversing and change speed transmission mechanism on the main frame driven by the power plant, traction bearing wheel driving means mounted on the yoke frame, flexible drive shaft connections between the transmission mechanism and the traction bearing wheel driving mechanism, means on the main frame coupled to the fifth wheel for driving the latter, forward and reversing mechanism for coupling the fifth wheel driving mechanism to the power plant, means for disconnecting said mechanism from the power plant and means on the main frame controlled by the movement of the fifth wheel for disengaging the fifth wheel operating mechanism, and thereby limiting the movement of the fifth wheel in the main frame.

10. A tractor comprising a main frame, having a circular bearing track near one end thereof, caster wheels supporting the other end thereof, a fifth wheel, side and load thrust bearings interposed between the fifth wheel and the circular ring track, a single traction bearing wheel journaled in the fifth wheel, a yoke frame carried by the fifth wheel, a spindle on the yoke frame in axial alinement with the axis of the fifth wheel, a power plant on the main frame, change speed and reversing mechanism on the main frame connected to the power plant, flexible driving connections between said mechanism and the traction bearing wheel carried in part by the yoke frame, power means connected to the plant for turning the fifth wheel in either direction, and means controlled by the movement of the fifth wheel for automatically disengaging said driving means when the fifth wheel approaches either limit of a predetermined rate of movement.

In testimony whereof I affix my signature in presence of two witnesses.

RALPH J. STIMSON.

Witnesses:
ANNA M. DORR,
LEWIS E. FLANDERS.